United States Patent Office 2,925,434
Patented Feb. 16, 1960

2,925,434

DINITROCYANOACETATES

Charles O. Parker, Huntsville, Ala.

No Drawing. Application March 6, 1956
Serial No. 569,944

16 Claims. (Cl. 260—465)

This invention concerns dinitrocyanoacetates,

NCC(NO$_2$)$_2$COOR and a method for the preparation of these novel compounds by reacting an oximinocyanoacetate,

NCC(NOH)COOR with nitric acid. In these formulae R represents a nontertiary alkyl, cycloalkyl, or benzyl group or a nitroalkyl, nitratoalkyl, haloalkyl, nitrobenzyl, cyanobenzyl, or carboxybenzyl group. These groups desirably do not contain over 12 carbon atoms.

I have discovered that esters of oximinocyanoacetic acid react best with nitric acid to give esters of dinitrocyanoacetic acid. The nitric acid is conveniently used in the form of mixed acid. Absolute nitric acid may be mixed with concentrated sulfuric acid or strong water-containing nitric acid may be mixed with fuming sulfuric acid for best yields. In place of sulfuric acid there may be used a phosphoric acid containing phosphoric pentoxide or a polyphosphoric acid.

The reaction is effected below about 30° C. and commonly between 0° and 20° C., although lower temperatures such as −10° or even −30° in some cases may be used by extending the reaction period. The oximinocyanoacetate and nitric acid as in mixed acid are brought together with stirring or turbulence usually most conveniently by adding the former to the latter gradually while the mixture is kept cool. During extended stirring protection from moisture is desirable. The mixed acid is best used in excess.

When mixing is completed, stirring is desirably continued while the reaction mixture is permitted to increase in temperature, as to about 20°–30° C. to complete the reaction. Choice of preferred temperatures depends upon the particular ester chosen with consideration towards its sensitivity and reactivity. For example, with the relatively more reactive methyl and ethyl esters, starting temperatures are desirably about 5° to 10° C. and finishing temperatures may go from 10° to 20° C. On the other hand, the cyclohexyl ester which is somewhat sluggish in its reaction rate is desirably reacted in early stages at 10° to 20° C. and the reaction therewith is completed at 20° to 30° C. These temperatures are also desirable for reacting the nitroalkyl or nitratoalkyl esters.

After the reaction is carried toward completion, layers are allowed to form and are separated. In some cases separation may be incomplete unless a solvent is added. In any case, it is convenient to take up the organic layer in an inert, volatile organic solvent such as a halohydrocarbon, typical of which are methylene dichloride, ethylene dichloride, carbon tetrachloride, chloroform, and chlorobenzene, or one such as nitromethane. The organic layer is washed with water to free it of acid and is then dried, as by treatment with a dehydrating agent such as calcium chloride, sodium sulfate, magnesium sulfate, or calcium sulfate in the form of soluble anhydrite. After the drying operation the product can be purified as by distillation or crystallization.

Some oximinocyanoacetates have previously been reported. They may be prepared by nitrosation of cyanoacetates, NCCH$_2$COOR, the group R having the same meanings as above. Thus a cyanoacetate, such as methyl, ethyl, isopropyl, butyl, hexyl, octyl, dodecyl, methylcyclohexyl, cyclopentyl, 2-nitratoethyl, 2-nitrobutyl, chloroethyl, bromoethyl, 2,3-dibromopropyl, 2-nitropropyl, cyanobenzyl, chlorobenzyl, or nitrobenzyl cyanoacetate is reacted with nitrous acid at low to moderate temperatures, such as 0° to 80° C. Usually nitrous acid is generated in situ by bringing together sodium nitrite and an acid such as acetic, hydrochloric, phosphoric, or sulfuric, or mixtures thereof. The resulting oximinocyanoacetate is separated, as by crystallization or precipitation.

The dinitrocyanoacetates are compounds which are useful as chemical intermediates, reacting, for example, with nucleophilic reagents, such as water, amines, or alcohols, to form dinitroacetonitrile, or with solutions of potassium salts to form potassium dinitrocyanomethide.

Some dinitrocyanoacetates are also useful as components of explosive or propellant mixtures and may be mixed or blended with the usual base materials. Such mixtures may contain 1% to 20% of the dinitrocyanoacetate ester. Again, one of these esters may be mixed with trinitrotoluene. The lower alkyl dinitrocyanoacetates can be mixed with other combustible nitro compounds with the precaution that the system not contain a nucleophilic material, as one having hydroxyl groups, to give compositions with different controlled burning rates. Also, they act as chain transfer agents when added to polymerizing systems. Furthermore, these compounds are useful as intermediates which can be stored and used to produce dinitroacetonitrile when it is desired, this latter not being a stable compound whereas the said esters are.

The dinitrocyanoacetates are also useful as reagents for determining hydroxyl groups or amino groups having hydrogen thereon in a mixture or in a solution of a compound. Thus water can be determined in a mixture or phenols, alcohols or weak organic acids. An excess of a dinitrocyanoacetate is added to the material in which the hydroxyl group is to be determined. It reacts as follows:

NCC(NO$_2$)$_2$COOR+H$_2$O ⟶ NCC(NO$_2$)$_2$$^\ominus$H$^+$+CO$_2$+ROH

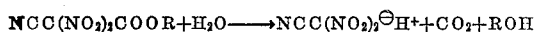
NCC(NO$_2$)$_2$COOR+R$^1$OH ⟶ NCC(NO$_2$)$_2$$^\ominus$H$^+$+RO$\overset{O}{\underset{\|}{C}}$OR$^1$

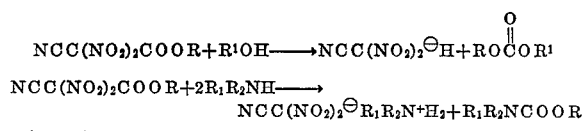
NCC(NO$_2$)$_2$COOR+2R$_1$R$_2$NH ⟶
    NCC(NO$_2$)$_2$$^\ominus$R$_1$R$_2$N$^+$H$_2$+R$_1$R$_2$NCOOR where R$_1$, R$_2$ are alkyl, aryl, or H.

From the intensity of the ultraviolet absorption maximum at 375μ there is determined the concentration of the NCC(NO$_2$)$_2$ ion, which is proportional to the hydroxyl or amine compound being measured.

Further details of the preparation of these new compounds are presented in the following examples, wherein parts are by weight unless otherwise designated. These examples are supplied for purposes of illustration and not by way of limitation.

*Example 1*

(a) To a vigorously stirred solution of 294 parts of sodium nitrite in 2400 parts of water was added ethyl cyanoacetate in an amount of 394 parts. To the resulting suspension 85% phosphoric acid was slowly added until a total of 210 parts of this had been used. The rate of addition to this acid was such as to maintain a pH of 4.5 in the aqueous suspension. The temperature thereof was held at 35°–40° C. with external cooling. After the phosphoric acid was added, the reaction mixture was stirred for 30 minutes at about 30° C. Addition was made of about 300 parts of concentrated hydrochloric acid, while the temperature of the mixture was raised to 50° C. The mixture was then cooled to —10° C. with precipitation of ethyl oximinocyanoacetate. This was filtered off, washed with water, and dried in an oven at about 50° C.

The filtrate was extracted with ethyl ether and from the extract an additional 40 parts of ethyl oximinocyanoacetate was recovered. The total yield of this product was 95% of theory.

(b) To a mixture of 482 parts by volume of white fuming nitric acid and 1260 parts by volume of 15% fuming sulfuric acid ethyl oximinocyanoacetate was added in small portions to a total of 568 parts by weight. During this time, the temperature of the mixture was maintained at 5°–10° C. by external cooling. After addition of the above ester, the reaction mixture was warmed to 15° C. and stirred at this temperature for 1.5 hours. Layers were then allowed to form and were separated. The upper layer was ethyl dinitrocyanoacetate. This was diluted with methylene chloride and washed three times with cold water. The washed solution was dried over magnesium sulfate. The dried solution was evaporated and the residue distilled at 55° C./2.5 mm. to give pure ethyl dinitrocyanoacetate. This compound has a refractive index, $N_D^{20}$, of 1.4340. The yield was about 75%. This compound contained by analysis 29.34% of carbon, 2.41% of hydrogen and 20.21% of nitrogen (theory 29.56%, 2.46%, and 20.69% respectively).

In a comparable manner isopropyl cyanoacetate was converted to isopropyl oximinocyanoacetate, melting at 105°–107° C., which was nitrated as above to give isopropyl dinitrocyanoacetate in good yield. This compound is a liquid distilling at 48°–49° C./0.3 mm. and having a refractive index at 20° C. of 1.4284. The analytical data established the above formula.

In connection with the study of this alkyl ester and others related to it, direct nitration of the corresponding cyanoacetate esters was performed. While in the case of the methyl ester nitration could be successfully carried to the methyl dinitrocyanoacetate in inferior yields, the nitration of other esters was even less satisfactory and in some cases difficult or impossible to control.

Example 2

There were mixed 96 parts of concentrated sulfuric acid and 30.5 parts of anhydrous nitric acid while the mixture was stirred, held at 5°–10° C., and protected from moisture with a drying tube. To this mixed acid, 25.6 parts of methyl oximinocyanoacetate was added in small portions while the reaction mixture was kept below 10° C. by cooling. Stirring was continued while the reaction temperature was allowed to rise to 20° C. Layers were allowed to form and were separated. The upper layer was taken up in methylene chloride. The resulting solution was washed well with ice water. The washed solution was dried over magnesium sulfate and distilled. At 41° C./0.3 mm. to 44° C./0.2 mm. there was obtained a 73% yield of methyl dinitrocyanoacetate. It has a refractive index, $N_D^{20}$, of 1.4370. It contained by analysis 25.48% of carbon, 1.52% of hydrogen and 21.95% of nitrogen (theory 25.40%, 1.59%, and 22.22% respectively).

By these procedures there may be used any of the other alkyl oximinocyanoacetates. For example, butyl oximinocyanoacetate yields butyl dinitrocyanoacetate distilling at 75° C./0.06 mm. in a falling film molecular still, while cyclohexyl oximinocyanoacetate yields cyclohexyl dinitrocyanoacetate, distilling at 70–75° C./0.07 mm. in a falling film molecular still. In the same way cyclopentyl oximinocyanoacetate is converted to cyclopentyl dinitrocyanoacetate, which is very close in its properties to those of the cyclohexyl ester. As is shown below the purity of these crude nitration products is generally such as to make distillation unnecessary for most purposes. This is also true of alkyl dinitrocyanoacetates having alkyl groups from 4 to 12 carbon atoms.

In a like manner, there have been carried out reactions leading to alkenyl and alkynyl cyanoacetates, which were converted to corresponding oximinocyanoacetates. The allyl oximinocyanoacetate melted at 100°–102° C. while the propargyl ester melted at 104°–105.5° C. These were nitrated with caution in the low range of reaction temperatures. The products isolated were shown to have undergone chemical transformation involving the unsaturated linkages.

Example 3

(a) *Preparation of p-nitrobenzyl cyanoacetate.*—Purified dioxane (103 parts) was refluxed in an extraction apparatus containing calcium hydride and diatomaceous earth in the extraction cup until gas evolution ceased. To the hot dioxane at refluxing temperature there were added 17 parts of dried cyanoacetic acid, 15.3 parts of p-nitrobenzyl alcohol and one part of sulfuric acid. Heating was continued for 12 hours, at which time 91.3% of the theoretical amount of hydrogen had been evolved, as measured in a wet-test meter. The solution was cooled and poured into 500 parts of water. The mixture was extracted with chloroform. The extract was dried and evaporated to give 14 parts of p-nitrobenzyl cyanoacetate, which was recrystallized from ethyl ether and then ethanol. It then melted at 68°–69° C.

(b) A solution of 8.5 parts of p-nitrobenzyl cyanoacetate in 18 parts of acetone was added to a solution of 2.8 parts of sodium nitrite in 5.0 parts of water. The two-phase mixture was stirred at 5° C. while 3.0 parts of acetic acid were slowly added. The mixture was stirred for an hour while the temperature was allowed to rise to 20° C. Layers formed and were separated. The organic layer was evaporated to give a viscous residue which solidified when triturated with water. The solid was thoroughly triturated with aqueous 10% sodium carbonate solution, washed, filtered, and dried. There was obtained a yield of 3.0 parts of solid, unreacted p-nitrobenzyl cyanoacetate. The sodium carbonate filtrates were acidified with hydrochloric acid, giving 3.5 parts of a solid melting at 151° C. with decomposition. This was recrystallized from aqueous ethanol and then melted at 158°–160° C. This product was proved to be p-nitrobenzyl oximinocyanoacetate.

(c) *Preparation of p-nitrobenzyl dinitrocyanoacetate.*—Sulfuric acid (5.1 parts) was slowly added to 1.6 parts of absolute nitric acid while the mixture was cooled in an ice bath. A solution of 2.5 parts of p-nitrobenzyl oximinocyanoacetate in 7.6 parts of cold anhydrous nitric acid was slowly added to the mixed acids while the reaction mixture was stirred and cooled to 5° C. The resulting clear solution was stirred for 45 minutes while the temperature was allowed to rise to 15° C. It was then poured onto crushed ice. A while solid precipitated. It was filtered off, washed with cold water, and dried to give 1.7 parts of p-nitrobenzyl dinitrocyanoacetate, melting at 55°–60° C. It was recrystallized from a mixture of benzene and cyclohexane and then melted at 62°–66° C. The identity of this product was confirmed by infrared analysis and also by hydrolysis to potassium dinitrocyanomethide.

When the benzyl esters are used in the above procedures, the product contains a mixture of isomers of nitrobenzyl dinitrocyanoacetate, which result from nitration of the aromatic ring.

Example 4

(a) *Preparation 2-nitratoethyl cyanoacetate.*—A solution of 107 parts of nitratoethanol, 127 parts of cyanoacetic acid, and 4.7 parts of p-toluenesulfonic acid in 131 parts of nitromethane was placed in a reaction vessel fitted with thermometer, stirrer, and a lower-layer solvent return water separator. The reaction mixture was stirred and heated to 50°–55° C. The pressure was reduced to cause refluxing in this temperature range. The reaction mixture was thus refluxed for eight hours with separation of about 15 parts of water. Solvent was then distilled off to a pot temperature of 70° C./12 mm. The residue was cooled, dissolved in 750 parts of methylene chloride, and twice extracted with ice-cold sodium bicarbonate solution (made from 60 parts of the bicarbonate in 800 parts of water). The solution was washed with cold water which was found neutral. The washed solution was dried over magnesium sulfate, solvent was evaporated and the residue was passed through a falling film still at a wall temperature from 94°–115° C./0.08 mm. There was obtained distillate with a refractive index at 20° C. of 1.4526 to 1.4603. From this, distillate, pure 2-nitratoethyl cyanoacetate was obtained upon redistillation. It distillated at 105°–106° C./0.035 mm., $N_D^{20}$ 1.4573.

(b) *Preparation of 2-nitratoethyl oximinocyanoacetate.*—A portion of the above ester (15.1 parts) was added to a solution of 7.2 parts of sodium nitrite in 100 parts of water. Concentrated hydrochloric acid was added at a rate to maintain a pH of 5.0. The exothermic reaction raised the temperature to 40° C. Since crystals began to appear, another 100 parts of water was added and the mixture was warmed to 50° C. to complete the reaction. The reaction mixture was cooled and extracted with ether to remove unreacted starting materials and/or impurities. The aqueous solution was acidified with concentrated hydrochloric acid until the solution was colorless. An oil precipitated which crystallized when cooled in an ice bath. Crystals were filtered off and dried. They were recrystallized from ethylene dichloride and then melted at 98°–98.5° C. They corresponded in composition to 2-nitratoethyl oximinocyanoacetate.

(c) *Preparation of 2-nitratoethyl dinitrocyanoacetate.*—There were mixed 71.4 parts of concentrated sulfuric acid and 22 parts of absolute nitric acid. To this mixture held below 10° C. by an external ice bath portions of 2-nitratoethyl oximinocyanoacetate were added to a total of 28.5 parts over a 30 minute period. Temperature was allowed to rise to 15°–18° C. for 90 minutes with stirring and then to 28° C. for another 30 minutes. Layers were allowed to form and were separated. The lower layer was extracted with methylene chloride and the extract was added to the oil layer. This mixture was washed three times with cold water and dried with magnesium sulfate. Infrared analysis showed this product to be practically pure 2-nitratoethyl dinitrocyanoacetate. The product was passed through a falling film molecular still at 95° C./0.05–0.15 mm., giving a slightly yellow product of 22.3 parts and leaving a residue of 4.8 parts. The former gave $N_D^{20}$ of 1.4663 and the latter of 1.4682. The product became colorless when washed with cold water and was quite pure. Analyses showed 23.13% of carbon, 1.79% of hydrogen and 19.89% of nitrogen (theory 22.73%, 1.52%, and 21.21% respectively).

This compound as follows from the above is resistant to hydrolysis. It is particularly useful in admixture with nitrocellulose and nitroglycerin in combustible propellants.

*Example 5*

By the procedures comparable to those of Example 4, there were prepared 2-nitrobutyl cyanoacetate starting from 2-nitrobutanol and cyanoacetic acid, 2-nitrobutyl oximinocyanoacetate from the above ester, and finally 2-nitrobutyl dinitrocyanoacetate. It had an infrared spectrum which showed the characteristic absorption for the cyano group at about 2220 cm.$^{-1}$, carbonyl at about 1780 cm.$^{-1}$, and dinitrocyanomethyl at about 1605 cm.$^{-1}$. It reacted with alcoholic potassium hydroxide giving the known potassium dinitrocyanomethide.

*Example 6*

The procedures of Examples 4 and 5 were applied to 2-bromoethanol and cyanoacetic acid to give 2-bromoethyl cyanoacetate, which was converted as above to 2-bromoethyl oximinocyanoacetate. This was reacted with a nitrating mixture in like manner to give 2-bromoethyl dinitrocyanoacetate. The product distilled in a falling film still at 80° C./0.21 mm. and had $N_D^{20}$ of 1.4826. It contained by analysis 22.41% of carbon, 1.27% of hydrogen, and 12.26% of nitrogen. (theory 21.28%, 1.42% and 14.89% respectively).

I claim:

1. New chemical compounds of the formula

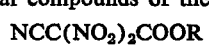

where R is a member of the class consisting of non-tertiary alkyl, nitroalkyl, nitratoalkyl, chloroalkyl, bromoalkyl, cycloalkyl groups, and benzyl, nitrobenzyl, and cyanobenzyl groups, these groups containing not over 12 carbon atoms.

2. The compound ethyl dinitrocyanoacetate.
3. The compound methyl dinitrocyanoacetate.
4. The compound p-nitrobenzyl dinitrocyanoacetate.
5. The compound 2-bromoethyl dinitrocyanoacetate.
6. The compound 2-nitratoethyl dinitrocyanoacetate.
7. A process for preparing esters of dinitrocyanoacetic acid which comprises reacting an ester of oximinocyanoacetic acid with nitric acid below about 30° C.
8. The process of claim 7 wherein the nitric acid is present in admixture with sulfuric acid.
9. A process for preparing an ester of the structure NCC(NO$_2$)$_2$COOR which comprises reacting an ester of the formula NCC(NOH)COOR with nitric acid below 20° C., R being a member of the class consisting of non-tertiary alkyl, nitroalkyl, nitratoalkyl, chloroalkyl, bromoalkyl, cycloalkyl groups and benzyl, nitrobenzyl, and cyanobenzyl groups, these groups containing not over 12 carbon atoms.
10. The process of claim 9 where the nitric acid is present in admixture with sulfuric acid.
11. The process of claim 10 wherein the reaction temperature is between 0° and 20° C.
12. A process for preparing ethyl dinitrocyanoacetate which comprises reacting below about 20° C., ethyl oximinocyanoacetate and nitric acid in admixture with sulfuric acid.
13. A process for preparing methyl dinitrocyanoacetate which comprises reacting below about 20° C. methyl oximinocyanoacetate and nitric acid in admixture with sulfuric acid.
14. A process for preparing p-nitrobenzyl dinitrocyanoacetate which comprises reacting below about 20° C. p-nitrobenzyl oximinocyanoacetate and nitric acid in admixture with sulfuric acid.
15. A process for preparing 2-bromoethyl dinitrocyanoacetate which comprises reacting below 30° C. 2-bromoethyl oximinocyanoacetate and nitric acid in admixture with sulfuric acid.
16. A process for preparing 2-nitratoethyl dinitrocyanoacetate which comprises reacting below 30° C. 2-nitratoethyl oximinocyanoacetate and nitric acid.

No references cited.